United States Patent

Kecskes

[11] Patent Number: 5,826,160
[45] Date of Patent: Oct. 20, 1998

[54] HOT EXPLOSIVE CONSOLIDATION OF REFRACTORY METAL AND ALLOYS

[75] Inventor: Laszlo J. Kecskes, Havre de Grace, Md.

[73] Assignee: The United States of America as represented by the Secretary of the Army, Washington, D.C.

[21] Appl. No.: 514,936

[22] Filed: Aug. 14, 1995

[51] Int. Cl.⁶ .................. B22F 1/00; F42D 3/00
[52] U.S. Cl. .................. 419/66; 419/61; 102/202.11
[58] Field of Search .................. 102/202.11; 419/6, 419/66, 61

[56] References Cited

U.S. PATENT DOCUMENTS

| | | | |
|---|---|---|---|
| 3,639,179 | 2/1972 | Reichman et al. | 75/171 |
| 3,763,783 | 10/1973 | Thomas et al. | 102/202.11 |
| 4,490,329 | 12/1984 | Hare et al. | 419/51 |
| 4,594,104 | 6/1986 | Reybould | 419/53 X |
| 4,655,830 | 4/1987 | Akashi et al. | 264/84 X |
| 4,925,501 | 5/1990 | Harasek | 419/66 X |
| 4,946,500 | 8/1990 | Zedalis et al. | 419/13 X |
| 5,114,645 | 5/1992 | Niiler et al. | 264/84 |
| 5,139,720 | 8/1992 | Takeda et al. | 419/11 X |
| 5,503,078 | 4/1996 | LeTual | 102/202.13 |

OTHER PUBLICATIONS

Hot Explosive Pressing of Powders, V.G. Gorobtsov & O. V. Roman, vol. 11 No. 1 Jan. 1975.

*Primary Examiner*—Peter A. Nelson
*Attorney, Agent, or Firm*—Freda L. Krosnick; Muzio B. Roberto

[57] ABSTRACT

A method and apparatus for fabricating high density monolithic metal and alloy billets. The process requires preheating precursor materials of metal or alloy billets by means of a combustion synthesis called Self-Propagating High-Temperature Synthesis (SHS). The reaction takes place in an insulated reaction vessel where the precursors, in a powder form, are heated to high temperatures. The precursors are then compacted to high density by means of pressure waves generated by detonation of an explosive. The method is capable of producing high purity tungsten and tungsten-based alloys of greater than 90% theoretical density.

6 Claims, 9 Drawing Sheets

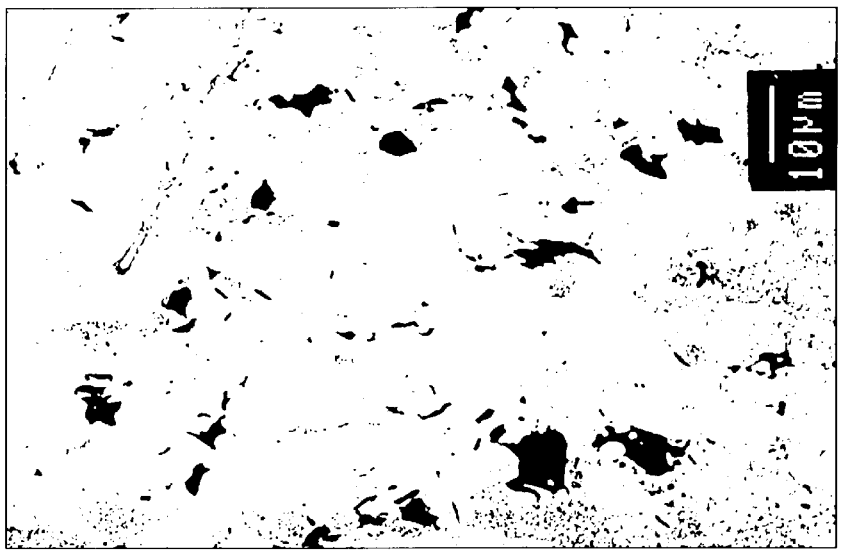
FIG. (3C)
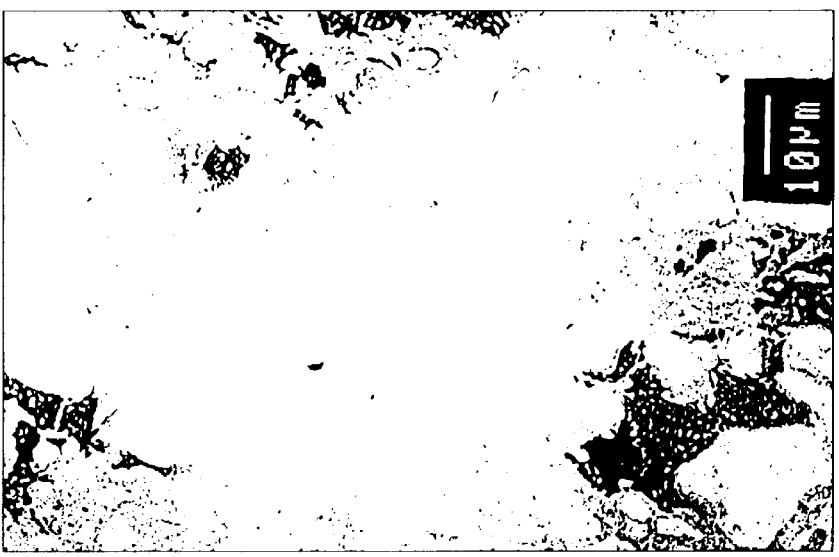
FIG. (3B)
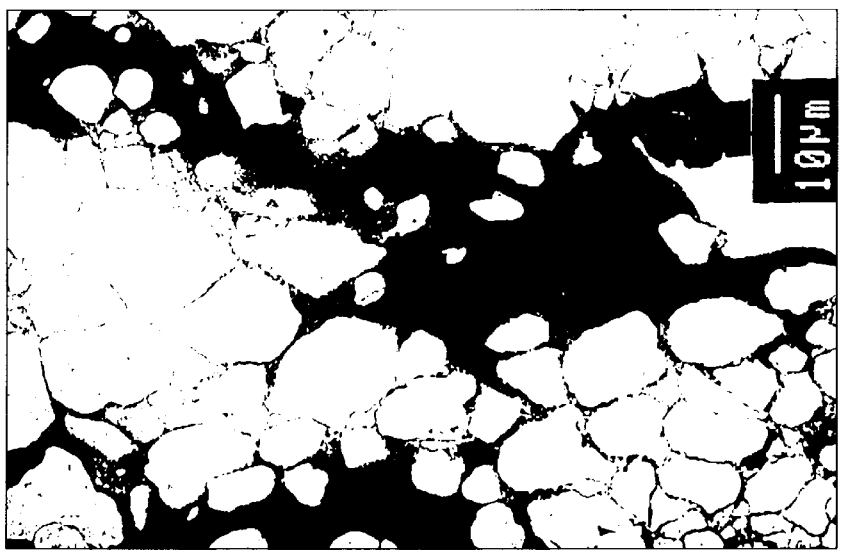
FIG. (3A)

FIG. (6B)

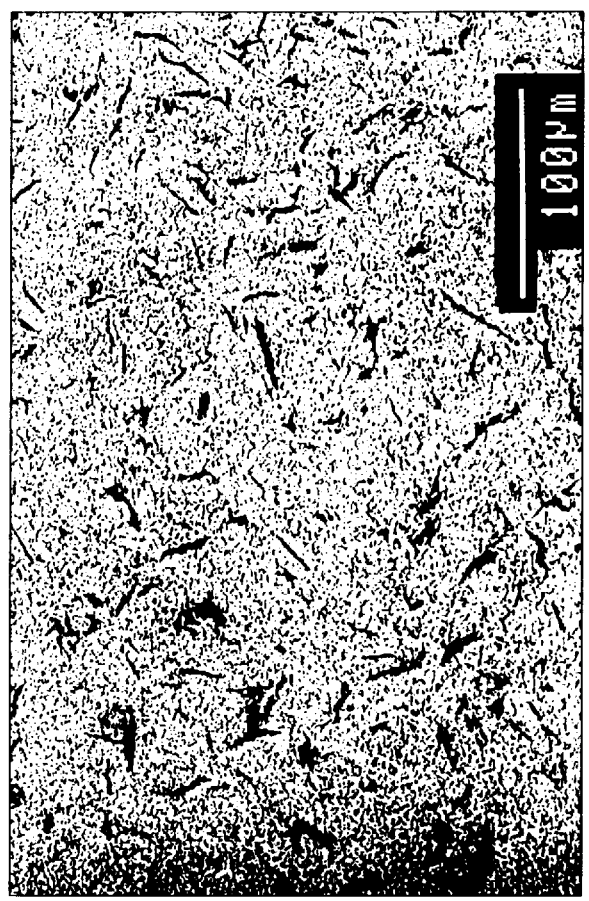
FIG. (7B)

HOT EXPLOSIVE CONSOLIDATION OF REFRACTORY METAL AND ALLOYS

The invention described herein may be manufactured, used, and licensed by or for the U.S. Government for governmental purposes without the payment of any royalties thereon, except as provided for by statute.

BACKGROUND OF THE INVENTION

1. Field of the Invention

This invention relates to a method and apparatus for the fabricating of high-density monolithic refractory metal and alloy billets, and more particularly to a two step process referred to as Combustion Synthesis Assisted Hot Explosive Compaction, and a vessel for containing and withstanding said reaction.

2. Discussion of Related Art

The development of improved refractory alloys comprised of tungsten, molybdenum, and tantalum is an ongoing research project. In general, the development of these alloys requires a continuous matrix phase of one of the components, good intergrain bonding between the primary and matrix phases, and good machinability. The metallurgy of the improved composition of the alloy requires that no intermetallics are formed.

Tungsten heavy alloys are most effectively produced by liquid phase sintering. Most of the existing liquid phase sintering technology for fabricating tungsten heavy alloys has been focussed on developing two phase composites, consisting of spheroidal tungsten particles embedded in a nickel-iron, or a copper-nickel matrix. Recently, there has been a renewed interest for extending the liquid phase sintering method to incorporate other matrix materials, such as titanium (Ti-6Al-4V), zirconium, hafnium, and other steel alloys. However, it has been determined, when using zirconium, hafnium or iron with this method, undesirable intermetallic phases may form if a critical temperature is exceeded.

Powder metallurgy methods are often considered when conventional forming routes, such as melting, casting and forging, are not appropriate. Such methods are more economical due to the fact that there is a reduced need for machining. Powder metallurgy methods produce products with near net-shape and practically finished dimensions. Recent developments in the preparation of powder precursors allow for greater control over the grain size and improved component distribution, resulting in a more homogeneous structure.

For the fabrication of a new class of tungsten heavy alloys, a method similar to liquid phase sintering is desired. In addition to conventional powder metallurgy fabrication techniques, such as liquid phase sintering, other processes have been considered. Examples of such processes include solid state sintering and coextrusion through a die, and the use of explosive compaction to consolidate and sinter the powdered precursors into full density products.

In consideration of alternative methods of fabricating tungsten heavy alloys, the explosive compaction method has the capability of producing not only consolidation of metal and ceramic powder, but equilibrium and non-equilibrium structures as well. Such tungsten heavy alloys are produced through exposure to and passage of a shock wave. The shock wave is generated by an impact of a projectile or a flyer plate, produced by compressed gas or detonation of an explosive. In producing the conventional compaction geometries, the application of the shock wave can be in either a planar or cylindrical configuration. As the shock wave propagates through the metal or ceramic powder, it densities the powder and produces bonding between adjacent articles.

The rapid densification rate produced by the shock wave, can result in low nonuniform densities, poor interparticle bonding and severe cracking of the structures. Furthermore, a rise in temperature of the powders occurs as a result of irreversible work occurring during the consolidation of distended solids. This rise in temperature has frequently been found to be insufficient in the development of bonding of the particles.

There has been an attempt to address the problem associated with the sudden rise in temperature associated with the shock wave in a report "Hot Explosive Pressing of Powders," by Gorobtsov and Roman. This report suggests a method known as Hot Explosive Compaction (HEC) which includes preheating the powder prior to exposure to the shock wave. The advantage of preheating the powder is to decrease its yield strength. This results in increasing ductility and allows for greater thermal softening.

A variation of the HEC method for consolidating tungsten-based alloys is the Combustion Synthesis Assisted HEC (CSA-HEC). This technique requires a self-propagating high-temperature synthesis reaction (SHS), thereby producing a chemical furnace, for preheating the powder sample prior to compaction. The SHS involves the synthesis of ceramic and intermetallic materials directly from their elemental precursors, by means of propagation of a solid-solid combustion front, through a green powder compact. Following initiation of the SHS process, the heat of the reaction is sufficient to sustain the reaction until all of the reactants have been consumed. Such reactions are characterized by rapid reaction rates, temperatures of approximately 3000 degrees C., and at times violent evolution of impurities trapped on the reactants.

An advantage of a combustion synthesis process, such as SHS, is that it requires a relatively small energy input, and the processing time is reduced to seconds, as opposed to hours. In addition, temperatures much higher than those of conventional furnaces can be achieved by such a process. Furthermore, the CSA-HEC method eliminates the remotely controlled transfer system used in the conventional HEC process for moving the heated powders from the furnace to the explosive assembly. By placing the heating source around the sample, allows for heating and consolidation of the powder in the same fixture.

There are significant differences between liquid phase sintering techniques, HEC and CSA-HEC processes. Liquid phase sintering allows for the tungsten to dissolve either partially or completely into the matrix, thereby making the initial metal powder morphology to be of less importance. In the past, application of the HEC process was limited to homogeneous systems, such as pure and prealloyed metals and ceramic powders. The long preheating cycle is likely to cause the dissolution of the tungsten into the matrix to form an extensive solid solution. However, in the CSA-HEC process, the length of the heating cycle is reduced. Therefore, it is likely that the solid solution formation would be limited to interfacial regions leaving the original tungsten grain morphology intact. The heating cycle characteristic is critical if the desirable properties are to be retained, such as size distribution and morphology of the refractory precursor. It should be noted that the rapid temperature quench may reduce impurity segregation at interfaces or grain boundaries. Adjustment of available heat and peak temperatures during the preheating cycles can be made to limit sintering, dissolution and melting in each phase in order to maintain the precursor structure and morphology. Thus, melting of the matrix metal can occur while preventing complete dissolution of the primary component.

In "Hot Explosive Pressing of Powders," by Gorobstov and Roman, the basic issues associated with HEC are defined. The powders are preheated in a furnace, while an explosive, a plane wave generator and a base plate are mounted and assembled. Following arming of the detonator, the furnace is opened and a container holding the hot powder is pushed along a guidance system until it is placed beneath the explosive charge. The time lapse between transfer of the container from the furnace until detonation of the explosive was less than 20 seconds. This technique consolidated large 10 mm ×100 mm ×180 mm flat plates. Tensile and Charpy impact strength tests of the HEC samples resulted in high ductility and toughness. This implies that the HEC compacts were strong enough for machining and mechanical working, without a need for sintering. The authors concluded that the HEC above recrystalization temperature of the material resulted in full density compacts. In addition, they speculated that in the course of extensive plastic deformation, the underlying mechanism responsible for this structure was dynamic recrystalization caused by high pressures and high temperatures.

The HEC process has also been addressed in "Hot Explosive Compaction of Metal Powders," by Bhalla. However, in place of the planar compaction used by Gorobtsov and Roman, Bhalla uses a cylindrical compaction configuration. The precursor powder mixture is placed in a sealed tube. The tube is then preheated in a furnace, quickly removed, transferred and dropped into the compaction apparatus, and consolidated to full-density. As a result, above recrystalization temperature HEC was controlled by the impact of the energy input, and that the temperature had a small influence on the density of the sample. Due to high temperature malleability and plasticity of powder, it was determined that the energy requirements were found to be substantially lower than when explosive compaction was performed at room temperature. Again, it was concluded that the compacts produced by the HEC method have superior mechanical properties and did not require additional sintering.

U.S. Pat. No. 4,655,830 to Akashi et al. and U.S. Pat. No. 5,139,720 to Takeda also disclose the application of a chemical furnace for enhancing the properties of SHS synthesized ceramics. The Akashi et al. patent further discloses an explosive compaction fixture designed to hold multiple sample capsules. The fixture is fitted with an external heating unit. Shock induced damage is reduced by positioning capsules off high-symmetry axes and attaching a momentum trap to the base of the fixture. After the heating element elevates the temperature of the entire steel fixture, the explosive container is allowed to slide onto the steel fixture, and is then remotely detonated. Among the unique features of this design, is the ability to synthesize twelve samples simultaneously. However, compaction of all twelve samples to full density is not likely to be achieved due to mechanical constraints imposed by the plurality of capsules. Results of the procedure were compared to compactions of different particle size, initial powders, and admixtures with graphite, silicon and Ti+C at temperatures of 600° C. and 700° C. The samples compacted at higher temperatures had less cracking, improved bonding, and increased hardness. It was found that cracking was associated with increase in grain size.

Finally, U.S. Pat. No. 5,114,645 to Niiler et al. discloses a two step process for producing fully dense ceramics. This method involves synthesis of the samples followed by compaction after their formation. In relation to the CSA-HEC method, this method uses preheating followed by compaction.

The following disclosure relates to the two-step process of Niiler et al. in combination with the chemical furnace disclosure of Akashi et al. and Takeda. This combination results in a unique two-step explosive compaction process. The SHS synthesized material is used only as a heat source and functions to provide the heat necessary to increase the temperature of an enclosed metal or alloy sample.

SUMMARY OF THE INVENTION

It is therefore an object of the present invention to provide an improved process for fabricating metal alloy billets.

Additionally, it is a further object of the invention to provide a vessel for containing a self-propogating high-temperature synthesis reaction.

In accordance with the invention, a method of providing a process for fabricating metal alloy billets is disclosed, comprising the steps of blending alloy precursors, preheating said precursor mixture with an external combustion synthesis reaction, and consolidating said mixture to a high density by means of detonating an explosive.

BRIEF DESCRIPTION OF THE DRAWINGS

The present invention will now be described in detail with reference to the attached drawings in which:

FIG. 3A is a core region of a backscattered electron micrograph of a polished surface of a full density W-Ti sample;

FIG. 3B is an intermediate region of a backscattered electron micrograph of a polished surface of a full density W-Ti sample;

FIG. 3C is an edge region of a backscattered electron micrograph of a polished surface of a full density W-Ti sample;

FIG. 6B is a core region of a backscattered electron micrograph of a pure tungsten sample;

DETAILED DESCRIPTION OF THE PREFERRED EMBODIMENTS

Figure 1:
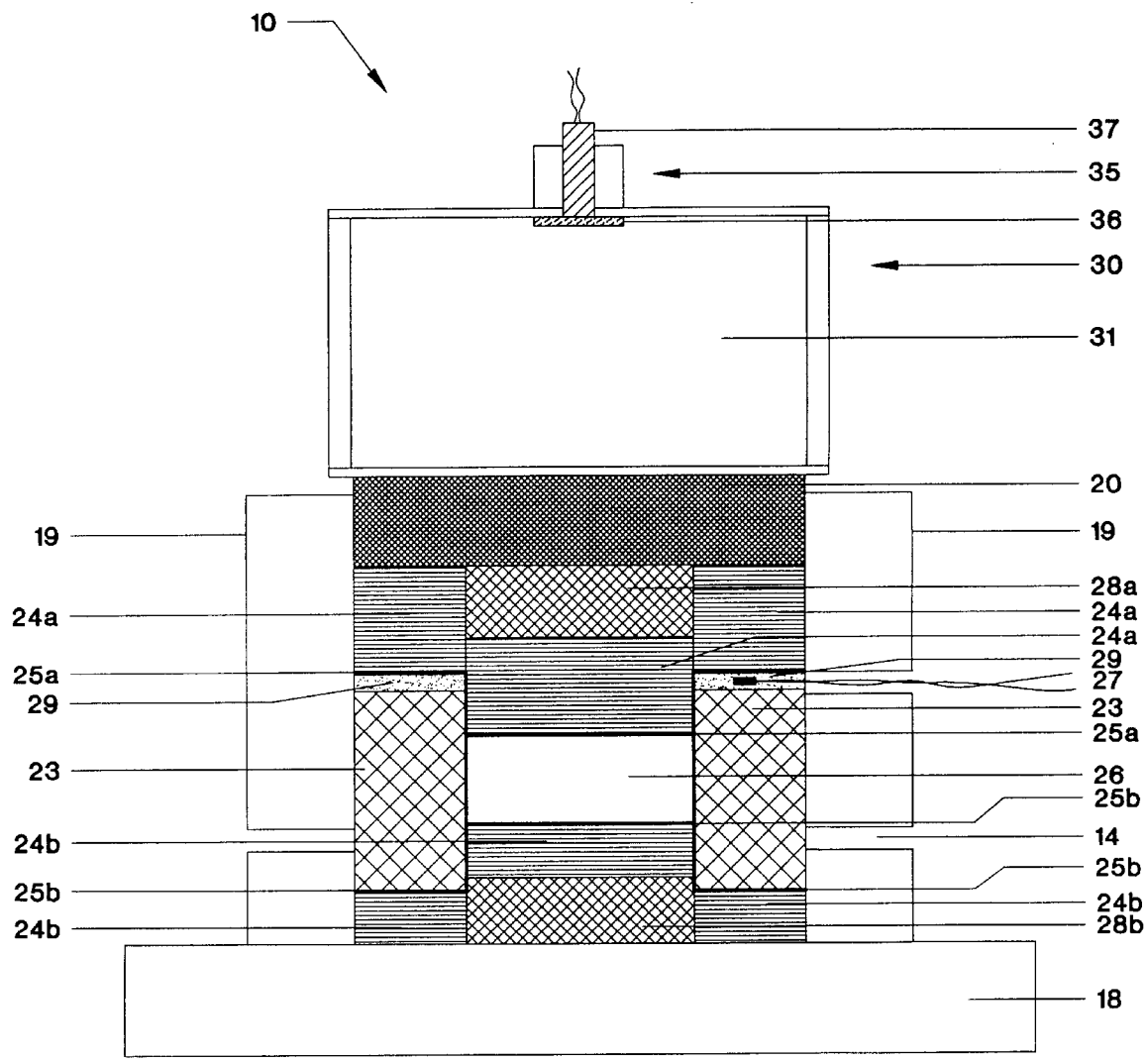
FIG. 1 is a schematic diagram of a vessel used for a combustion synthesis assisted hot explosive reaction.

A primary feature of this invention is that a Combustion Synthesis Assisted Hot Explosive Compaction reaction (CSA-HEC) take place and be contained in a single vessel. The vessel functions to contain a Ti+C Self-Propagating High-Temperature Synthesis reaction and as a die to the explosive compaction vessel.

The reaction vessel 10 has vent holes 14 bored into the wall 16 for releasing copious quantities of volatile impurities of the Self-Propagating High-Temperature Synthesis (SHS) reaction. While there is no minimum nor maximum requirement for the number of vent holes 14, there shall be enough to allow for relatively free gas movement.

The reaction vessel 10 is comprised of a strong material, such as steel or a ceramic composition, to allow it to withstand detonation of an explosive near the vessel. To ease fabrication, the reaction vessel 10 is comprised of two parts, a base 18 and a doughnut 19, comprised of a strong material such as steel or a ceramic material. In a preferred embodiment, the base has a thickness of approximately 51 mm and both a width and length of 153 mm, and the doughnut has a wall thickness of approximately 25 mm, a height of 102 mm and an inner diameter of 102 mm. The base 18 has a large diameter to provide stability to the vessel 10 and to reduce accidental tipping of the contents of the mixture. Furthermore, the base 18 is thick enough to reduce any mechanical deformation, such as dishing or flexure, caused by detonation of an explosive. Additionally, the thickness of the base 18 acts to reduce reflected shock waves from the free surface at the bottom of the base. When assembling the vessel 10, the doughnut 19 is placed at the center of the base 18 and welded thereto.

The lid assembly of the reaction vessel 10 serves as a composite anvil. The composite anvil assembly further comprises an aluminum piston 20 fitted to seal a cavity 26 of the vessel 10, and a high hardness steel disk or doughnut 28a. The steel disk 28a matches the shape of the piston 20 and the shape of a W+Ti sample 22 located in the cavity 26 of the vessel. For added flexibility, the piston may be comprised of materials other than aluminum, such as hard wood or fiberglass. In a preferred embodiment, the composite anvil assembly is ground to a diameter of 52 mm and a thickness of 14 mm, and the aluminum piston to a diameter if 101 mm and a thickness of 19 mm. The W+Ti sample located in the cavity 26 of the vessel 10, has a preferred weight of 255 g (1.58 moles), with a diameter of 52 mm and a thickness of 18 mm.

At a top area of the aluminum piston 20, an explosive container 30 is attached thereto. The explosive container 30 has a cavity 31 therein for holding an explosive, and a lid assembly 35. The lid assembly is comprised of a detasheet booster 36 and a detonator 37. In a preferred embodiment, the explosive container is comprised of poly vinyl chloride having a height of 150 mm, and a diameter of 4 inches, and having a holding capacity of 1250 grams of a powdered explosive, such as Amatol. Additionally, in another preferred embodiment, the detasheet booster 36 is comprised of C-4 and the detonator 37 is comprised of RP-80.

At a bottom end of the reaction vessel cavity 26, a second hardness steel insert 28b is placed. The second steel insert 28b functions together with the first steel insert 28a in controlling the specific volume differences between the chemical furnace 23 and the sample. When the sample is at full density, it occupies a smaller volume of space than the chemical furnace 23. In order to compensate for this difference in volume arising upon compaction, the first steel insert 28a and the second steel insert 28b are employed to avoid the less dense chemical furnace material from preventing full densification of the sample. The degree of densification is controlled by a combinations of the thickness of the aluminum piston 20, and the amount of explosive. The aluminum piston 20 lengthens the duration of the applied pressure pulse, and the amount of explosive determines the imparted energy.

The vessel 10 further comprises an insulation comprised of Zirconia disks 24a and 24b for reducing heat loss from the system. The Zirconia disks 24a and 24b are used to line the top and bottom portions of the cavity 26. In addition the Zirconia disks provide insulation for protecting the aluminum piston 20, the composite anvil assembly 21 and explosives from overheating.

Grafoil sheets 25a and 25b are used to provide an inert barrier by separating the outer surface of the sample from the adjoining Ti+C furnace 23 and zirconia disks 24a and 24b. The primary function of the Grafoil sheets 25a and 25b are to ease separation of the compacted components. Additionally, the Grafoil sheets 25a and 25b function as an inert barrier thereby preventing diffusion of contaminants into the sample. In a preferred embodiment, the zirconia disks 24a and 24b have a nominal thickness of 12 mm fitted in the areas beneath and above the Ti+C furnace 23 and the sample. Furthermore, in another preferred embodiment, the grafoil sheets 25a and 25b are 0.4 mm thick, and the Ti+C furnace 23 is doughnut shaped, weighing 600 grams (10 moles) with an outer diameter of 100 mm, an inner diameter of 53 mm and a thickness of 44 mm. As an alternative to Grafoil, thin sheets of metal foils having high melting points can be used as well. For example, by replacing the Grafoil sheets with Tantalum foil results in elimination of hairline surface and peripheral cracks in the samples. Finally, an igniter mixture 29 comprised of 15 grams of 0.5 molar ratio of Ti+B is located adjacent the Ti+C green compacts. A set of electric matches 27 are packed loose in said igniter mixture 29 with its leads brought through one of the vent holes 14. In cases in which more than one match is needed, the leads of the matches 27 are connected in parallel outside the vessel 10 to ensure simultaneous ignition.

The procedure for fabrication of metal alloy billets is initiated with placement of the vessel on a sandpile of approximately two to three meters high. Following the procedure, the fixture is buried under sand to protect the vessel and its contents from thermal shock during the cooling down process. A compatible set of alloy precursors is selected and thoroughly blended and stored under argon. The elemental powders used for the chemical furnace (Ti+C) are also blended. Following the blending process, and with the detonator in place, an electric match assembly is activated. The electric match assembly initiates the Ti+C reaction. As the reaction proceeds to completion, the heat pulses generated by the SHS reaction diffuse into the W+Ti powder bed. This causes the outer periphery of the W+Ti powder bed to heat up rapidly while the interior portion heats up more slowly. As the outer periphery begins to cool down and the interior portion continues heating up, at a certain point the powder bed becomes isothermal. At this point of isothermal temperature, the anvil becomes activated by detonation of an explosive. The explosive functions to densify both the sample and the Ti+C furnace. Following cooling down of the vessel and its contents, the sample can then be extracted therefrom. After the cooling down process has been completed, the alloy billets are exposed to a post compaction heat treatment means for reducing residual stresses, homogenization and enhancement of microhardness and intergrain bonding. As a result of the above described processes, the alloy billets produced have a plurality of sizes and shapes and are prepared for withstanding machining without deteriorating.

EXAMPLE 1

Fabrication of a 95W-5Ti Wt. % Alloy Billet

High purity 99.9%, 12 micrometer tungsten, 99.5% pure, −325 Mesh titanium, and 99.9% pure, 2 micrometer graphite powders were used. The titanium and tungsten powder mixture was stored in argon until the experiment was performed. For maximum heat release, the titanium and graphite powders were mixed with a Ti/C molar ratio of 1.0. The Ti+C mixture was uniaxially pressed at 44 MPa into several 100 mm outer diameter, 53 mm inner diameter and 20 mm thick doughnut shaped green compacts.

The fabrication process was initiated by means of an electric match, which was activated by a 45 Volt battery, resulting in initiating the igniter mixture and the SHS reaction. The Ti+C reaction was completed in about 3 seconds. After a 60 second delay, the explosive was detonated, consolidating the contents of the fixture. After compaction, the CSA-HEC W+Ti sample had a diameter of 51 millimeters, and an average thickness of 9 millimeters. The density of the alloy was 98.9% T.D. Microhardness measurements of the alloy, by means of a Vickers indenter with a 100 g load, yielded a hardness value of 5.0+/-0.1 GPa.

Adiabatic heat balance calculations, supported with cursory temperature-time data measurements, indicated that the $n_{TiC}/n_S$ ratio (moles of TiC to moles of the sample) significantly affected the heating rates and peak temperatures attained within the sample. For better compaction results, the $n_{TiC}/n_S$ ratio should be adjusted so that as much of the bulk of the sample would be near TmTi of 1670 degree Celsius, and excessive overheating of the periphery would be minimized. However, it should be noted that unless a large enough $n_{TiC}/n_S$ ratio is used, the sample will not become isothermal at any point during the preheating cycle. An ideal $n_{TiC}/n_S$ ratio of 6.3 satisfies both of the criteria discussed above, and generates an interior temperature of 1550 degrees Celsius for the 95W-5Ti system.

Figure 2:
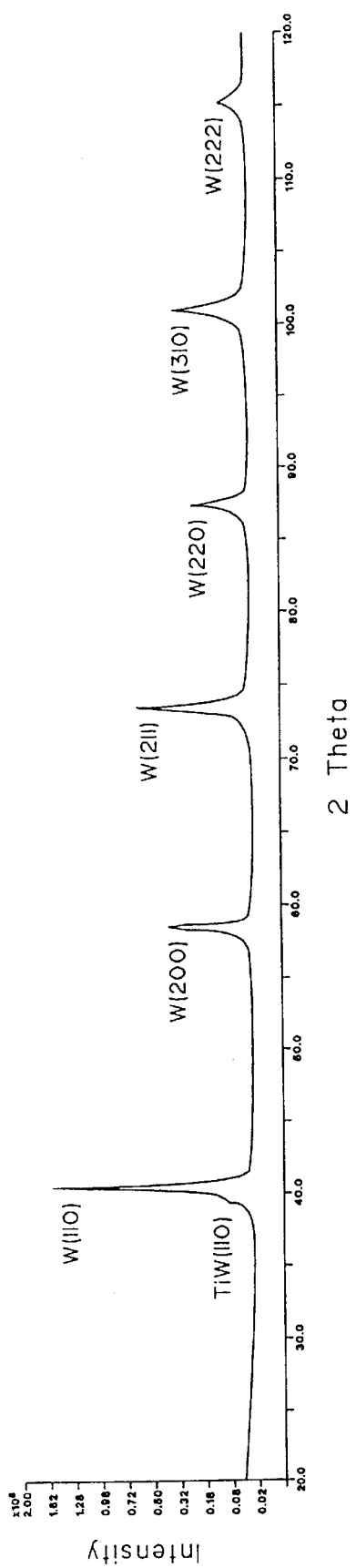
FIG. 2 is a x-ray diffraction spectrum of a 95W-5Ti sample.

Microscopy of transverse and longitudinal cross-sections, with respect to the compaction axis, revealed a preferentially oriented two phase structure. The distribution of the primary and secondary phases was isotropic in the transverse view. However, both phases tended to be elongated along a transverse plane in the longitudinal view. EDS analysis of the samples showed that the primary matrix phase consists of only W, and the secondary matrix phase is a Ti-rich solid solution of Ti and W. No other elements were identified in the W-Ti samples during the analysis. Furthermore, the presence of W and Ti rich phases was verified by X-ray diffraction analysis, See FIG. 2. When examining the X-ray diffraction of a 95W-5Ti sample, as seen in FIG. 2, only the peaks corresponding to bcc W can be clearly recognized. Due to the relatively small amount of Ti-rich matrix phase in the 95W-5Ti sample, only the 110 diffraction peak appearing on the shoulder of the 110 W peak was seen. The W peaks were not shifted, which indicates little or no deformation of the crystal lattice. The average lattice parameter was 0.3158 nm, which is within an accepted range. Other minor peaks are a result of the Al sample holder.

Polished cross sections from the central, intermediate and edge regions are shown in FIGS. 3A, 3B and 3C for a full density W-Ti sample. FIG. 3A reveals a structure consisting of loose W grain aggregates (light gray) bounded by a Ti-rich matrix (dark gray). The sample core comprises a disk with a radius of about 19–20 mm. The W grains have a particle size of 10–20 μm. The Ti-rich phase contains an equiaxed grain structure with an average size of 5–10 μm. Using semiquantitative EDS analysis, the W in the aggregates has been shown to be mostly pure, and the Ti-rich phase has a composition of about 50W-50Ti. However, the micrograph of the intermediate region of the sample, as shown in FIG. 3B, reflects a shift from this morphology caused by higher local temperatures. The annular region surrounding the core is approximately 3–6 mm inward from the edge of the sample. FIG. 3B shows more intermixing between the components, in contrast to the relative homogeneity of each phase observed in FIG. 3A. Finally, the edge region (the outer 3 mm annulus) of the sample, as shown in FIG. 3C, exhibits thermally the most active condition between the two components. The edge region of the sample shows the W particles having mostly dissolved leaving small isolated Ti-rich islands. In contrast, FIGS. 3B and 3C show the W particles and Ti regions having straighter edges, therefore indicating a greater amount of plastic deformation.

Figure 4:
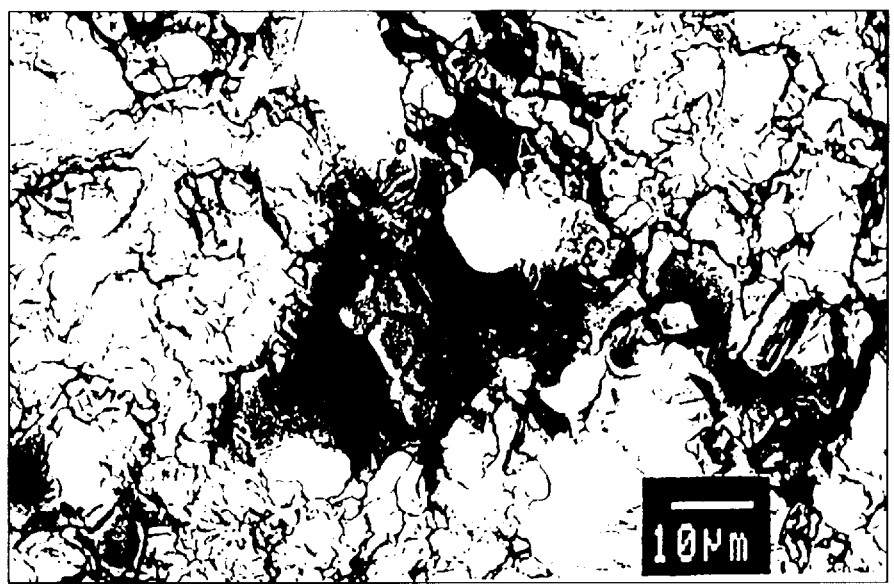
FIG. 4 is a fractured surface of a 95W-5Ti sample.

Scanning electron microscopy (SEM) examination of fracture surfaces revealed no significant changes between edge and core regions of the sample. A typical fracture surface from the core region of the sample exemplifies intergranular and transgranular failure mode (See FIG. 4). The majority of grains failing by transgranular fracture tend to be in the proximity of the Ti-rich phase. However, grains failing by means of intergranular fracture are predominantly localized within the W aggregates. The presence of transgranular cleavage is a clear indication that the sample has developed adequate bonding.

Twenty four hour long post compaction annealing treatments of the alloy samples were performed at temperatures of 700, 1000 and 1400 degrees Celsius. Resultant microstructural changes were monitored with Scanning Electron Microscopy and microhardness measurements. At the lower temperatures, partial dissociation of Ti-rich matrix in the alloy is observed and reflected in a 6% increase n the alloy's microhardness. At the highest temperature, the annealing process causes the complete dissolution of the W in the Ti-rich matrix. This results in a 6% decrease in the alloy's microhardness.

A representative piece of the alloy was subjected to post-consolidation machining with conventional drilling, milling and turning techniques. Scanning Electron Microscopy examination of machined chips demonstrate that post-consolidation processing of the billets into structural parts is straightforward and does not require any special attention. Therefore, annealing of the billet can be used if desired, but is not necessary.

EXAMPLE 2

Fabrication of an 80W-20Ti Wt. % Alloy Billet

Figure 5:
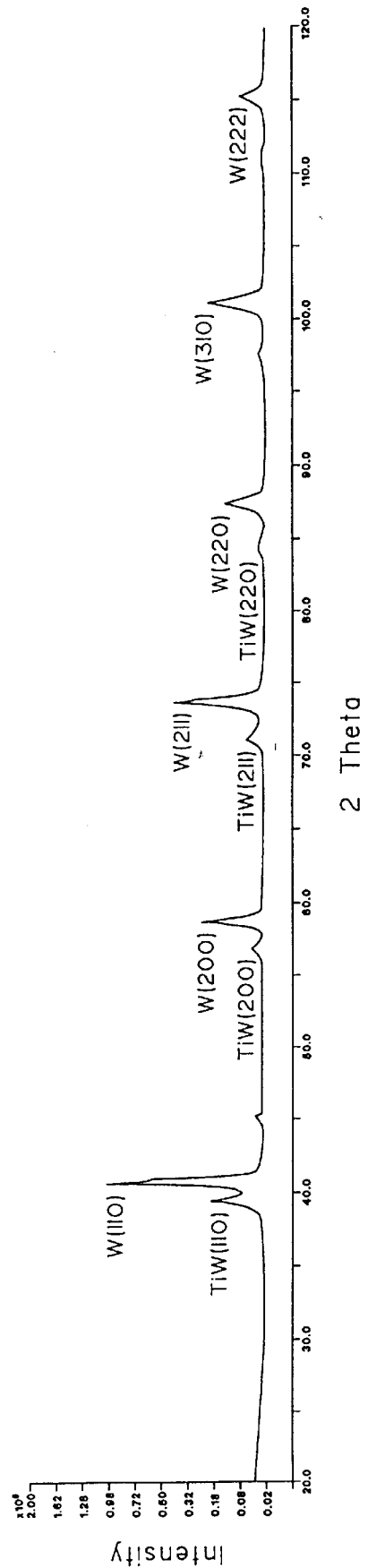
FIG. 5 is a x-ray diffraction spectrum of a 80W-20Ti sample.

Using the method described in Example 1, a 99.4% T.D. sample was chosen to demonstrate the flexibility of the CSA-HEC technique. The $n_{TiC}/n_S$ ratio was 5.7. The X-Ray Diffraction spectrum, shown in FIG. 5, reflects the presence of a second phase, which corresponds to a bcc structure with an average lattice parameter of 0.3250 nm. Verification of the X-Ray Diffraction data with Energy Dispersive X-ray Spectroscopy (EDS) confirmed that the solid solution is 34W-66Ti. There was very little modification to the precursor tungsten morphology.

EXAMPLE 3

Fabrication of Monolithic Tungsten Billet

Using the method described in Example 1, pure elemental tungsten powder was consolidated to a density of 96.6% T.D. A $n_{TiC}/n_S$ ratio of 6.1 was used.

Figure 6A:
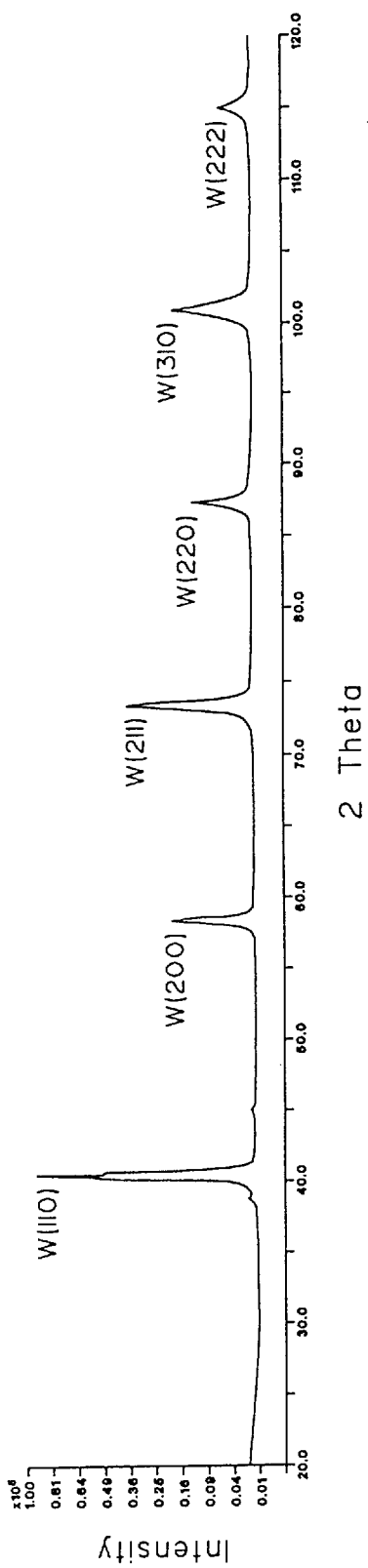
FIG. 6A is a x-ray diffraction spectrum of a pure tungsten sample.

This test was a critical evaluation of the CSA-HEC technique due to the absence of a softer Ti phase. The X-ray Diffraction spectrum, shown in FIG. 6A, shows only tungsten peaks. The two small peaks at 2 Theta of 38.7 and 44.9 degrees correspond to the major X-ray Diffraction peaks of aluminum attributable to the holder of the sample. Scanning Electron Microscopy (SEM) observation of the etched surface of a polished cross-section from the CSA-HEC tungsten sample's core region revealed an equiaxed grain structure.

FIG. 6B shows the absence of the preferential orientation seen in the W-Ti alloy. Generally, the precursor tungsten powder morphology was retained with some fine porosity remaining along grain boundaries. As seen from the scanning electron micrograph and the high melting point of tungsten, it may be concluded that the ratio of $n_{TiC}/n_S$ generated insufficient temperatures in the interior of the tungsten powder bed. As a result, no claims can be made regarding the quality of intergrain bonding. However, the CSA-HEC method readily lends itself to adjustment of the $n_{TiC}/n_S$ ratio to attain much higher temperatures.

EXAMPLE 4

Fabrication of Monolithic Titanium Billet

As a final evaluation of the method for the W-Ti system, pure elemental titanium was consolidated. A $n_{TiC}/n_S$ ratio of 5.6 yielded a sample with a density of 95.6% T.D.

Figure 7:
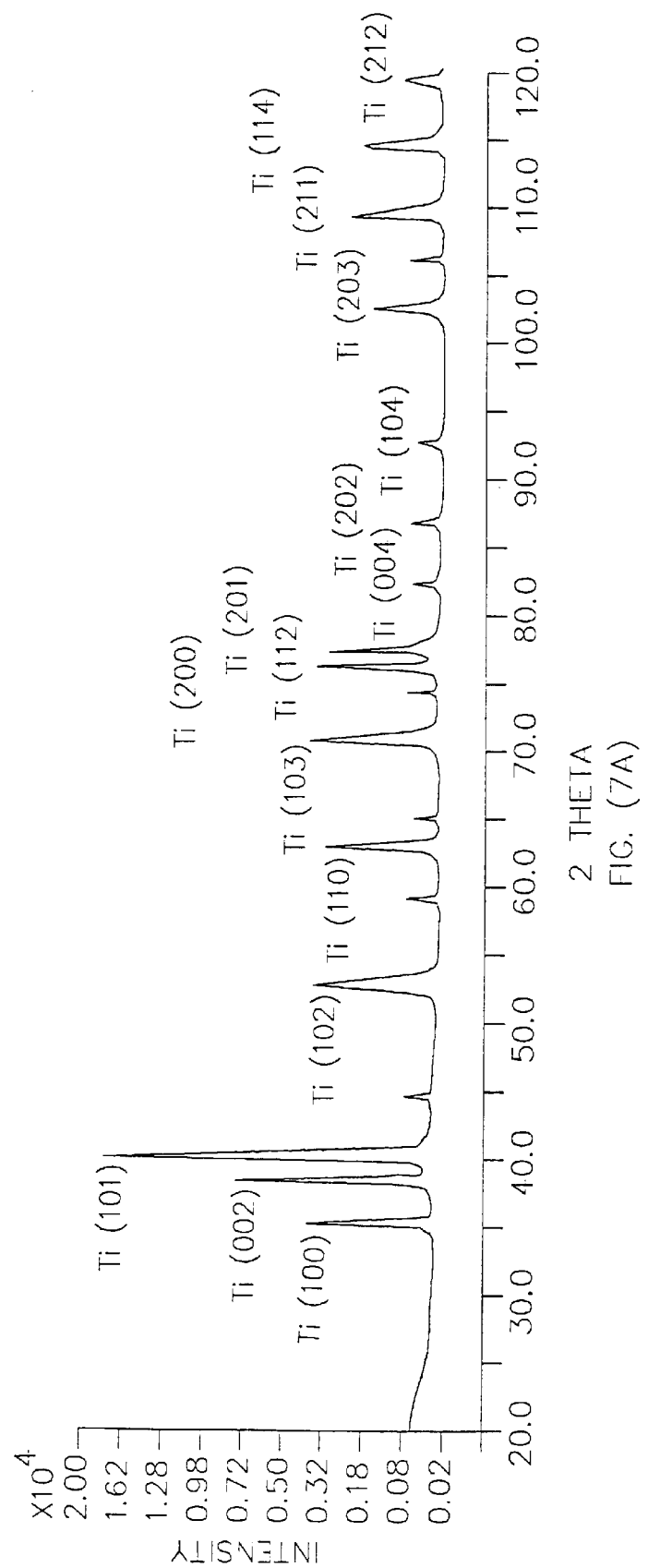
FIG. 7A is a x-ray diffraction spectrum of a pure titanium sample.
FIG. 7B is a core region of a backscattered electron micrograph of a pure titanium sample.

The X-ray Diffraction analysis, shown in FIG. 7A, indicated that the sample was hcp alpha-Ti only. These results were expected, due to the absence of tungsten, which is a beta-Ti stabilizer. Scanning Electron Microscopy (SEM) observation of the etched surface of a polished cross-section of the Ti sample's core region revealed randomly distributed, heavily deformed, elongated grains with a secondary phase between grains. From the appearance of the grains, as seen in FIG. 7B, it may be further concluded that in this example the temperature was sufficiently high but did not exceed $T_mT_i$. The grain boundary phase can be most likely attributed to the titanium oxide film stripped away during consolidation.

The foregoing examples were designed to illustrate the utility of the CSA-HEC process within the W-Ti system only. Results of preliminary experiments with Ta-Cu alloys demonstrated that this invention can be extended to other metal and metal alloy systems as well.

EXAMPLE 5

Fabrication of a 75Ta-25Cu Wt. % Alloy Billet

High purity 99%, −325+400 Mesh tantalum, 99.5% pure, −325 Mesh copper, and 99.9% pure, 2 μm graphite powders were used. The alloy composition in this example was 75Ta-25Cu wt. %. The Ti+C mixture was uniaxially pressed at 22 MPa into a single 100 mm outer diameter, disk-shaped green compact. Several 23 mm diameter holes were drilled into this disk to allow for the insertion of small 19 mm diameter, 18 mm thick Ta-Cu green compacts. The $n_{TiC}/n_S$ ratio was approximately 13. The X-Ray Diffraction analysis indicated only bbc Ta and fcc Cu phases, which is consistent with the phase relation between Ta and Cu. Scanning Electron Microscopy (SEM) examination of an etched surface of a polished cross-section of one of the Ta-Cu sample's core region showed random, isotropically distributed, rounded Ta grains with secondary Cu phase between grains. The density of this alloy was 81% T.D.

Although the present invention has been described in connection with preferred embodiments thereof, it will be appreciated by those skilled in the art that additions, deletions, modifications, and substitution not specifically described may be made without departing from the spirit and scope of the invention as defined in the appended claims.

What is claimed:

1. A process for the fabrication of metal alloy billets comprising;

selecting a vessel;

blending an alloy precusor mixture;

storing said precusors under argon in the vessel;

placing said vessel in a sand pile to protect said vessel and contents therein;

activating said precusor mixture by means of a electric match;

preheating said precusor mixture by means of an external combustion synthesis reaction, to produce a precusor mixture having a high purity;

preheating said resultant precusor mixture;

consolidating said mixture to a a high density by the detonation of an explosion, and steel insert means;

exposing said billets to post compaction heat treatment means. and receovering the billets.

2. The process of claim 1, wherein a post compaction heat treatment means reduces residual stresses in said alloy billets.

3. The process of claim 1, using a concentric chemical furnace means for preheating said mixture.

4. The process of claim 1, wherein said alloy billets being ready for withstanding machining.

5. The process of claim 1, wherein activating said precursor mixture by means of an electric match.

6. The process of claim 1, wherein said alloy billets having a plurality of sizes and shapes.

* * * * *